(12) United States Patent
Agtuca

(10) Patent No.: US 10,422,317 B2
(45) Date of Patent: Sep. 24, 2019

(54) ADVERTISING HORIZONTAL AXIS WIND GENERATOR

(71) Applicant: Peter Agtuca, Auburn, WA (US)

(72) Inventor: Peter Agtuca, Auburn, WA (US)

( * ) Notice: Subject to any disclaimer, the term of this patent is extended or adjusted under 35 U.S.C. 154(b) by 511 days.

(21) Appl. No.: 15/270,369

(22) Filed: Sep. 20, 2016

(65) Prior Publication Data
US 2017/0130695 A1    May 11, 2017

Related U.S. Application Data

(63) Continuation-in-part of application No. 14/896,478, filed as application No. PCT/US2014/041605 on Jun. 9, 2014, now abandoned.

(60) Provisional application No. 61/832,574, filed on Jun. 7, 2013.

(51) Int. Cl.
| | |
|---|---|
| *F03D 7/02* | (2006.01) |
| *F03D 1/06* | (2006.01) |
| *G09F 19/02* | (2006.01) |

(52) U.S. Cl.
CPC ......... *F03D 1/0675* (2013.01); *F03D 7/0236* (2013.01); *G09F 19/02* (2013.01); *F05B 2220/25* (2013.01); *F05B 2240/31* (2013.01); *F05B 2270/32* (2013.01); *Y02E 10/721* (2013.01); *Y02E 10/723* (2013.01)

(58) Field of Classification Search
None
See application file for complete search history.

(56) References Cited

U.S. PATENT DOCUMENTS

| | | | | |
|---|---|---|---|---|
| 476,716 | A * | 6/1892 | Winge | F03D 3/00 416/118 |
| 802,144 | A * | 10/1905 | Harrington | 416/132 R |
| 1,450,263 | A * | 4/1923 | Schiesari | G09F 19/18 340/815.56 |
| 1,507,187 | A * | 9/1924 | Juhl | F03D 3/065 40/479 |
| 1,922,866 | A * | 8/1933 | Rosenberg | B64C 27/021 244/218 |

(Continued)

*Primary Examiner* — Carlos A Rivera
*Assistant Examiner* — Theodore C Ribadeneyra
(74) *Attorney, Agent, or Firm* — Dean Craine; Marisa Whitaker

(57) ABSTRACT

A wind generator system with a plurality of lightweight, surface area adjustable airfoil/sail blades. Each blade is triangular or wedge shape with a narrow inner edge and a wide outer edge. Each blade includes an inner frame connected to a rigid mast that extends radially from a hub assembly. Each blade includes a curved outer skin layer that extends over the inner frame and configured into air foil shape with a large curved leading edge and a thin trailing edge. The outer skin layer is secured along its leading edge and removeably attached along its trailing edge to the inner frame. Advertising is printed on the outer skin of at least one blade that is visible. Coupled to the outer skin layer is a first linear actuator that when activated, causes the outer skin layer to fold or unfold thereby changing the blade's surface area. The internal frame may include a second linear actuator and a telescopic mast over which the blade slides to increase or decrease the sweep area of the blades. Wind or electrical sensors are coupled to the mast and the retractable cable to automatically control the sweep area and the surface areas.

6 Claims, 24 Drawing Sheets

(56) References Cited

U.S. PATENT DOCUMENTS

| | | | | |
|---|---|---|---|---|
| 3,318,279 A * | 5/1967 | Padilla | | B60Q 7/005 116/63 P |
| 4,118,637 A * | 10/1978 | Tackett | | F03D 7/06 290/55 |
| 4,208,168 A * | 6/1980 | Chen | | F03D 3/065 416/132 B |
| 4,342,539 A * | 8/1982 | Potter | | F03D 7/06 416/9 |
| 4,435,125 A | 3/1984 | Cook | | |
| 4,818,180 A * | 4/1989 | Liu | | F03D 7/06 416/117 |
| 5,454,694 A * | 10/1995 | O'Dell | | F03D 3/0409 416/197 A |
| 5,697,314 A * | 12/1997 | Clausin | | B63H 9/1042 114/106 |
| 5,953,841 A * | 9/1999 | Sawyer | | G09F 15/0087 40/124.191 |
| 6,175,354 B1 * | 1/2001 | Blissett | | F04D 29/38 345/110 |
| 7,179,149 B2 * | 2/2007 | Chernick | | A63H 33/22 417/234 |
| 7,396,207 B2 | 7/2008 | Delong | | |
| 7,436,086 B2 | 10/2008 | McClintic | | |
| 7,448,337 B1 | 11/2008 | King | | |
| 7,572,111 B2 * | 8/2009 | Hsu | | F04D 29/00 345/31 |
| 8,157,383 B2 * | 4/2012 | Scanlon | | G03B 21/00 345/204 |
| 9,447,690 B2 | 9/2016 | Agtuca | | |
| 9,741,272 B1 * | 8/2017 | Chen | | G09F 11/235 |
| 2007/0166148 A1 * | 7/2007 | Middleton | | F04D 29/38 415/118 |
| 2007/0247832 A1 * | 10/2007 | Barker | | G09F 23/02 362/96 |
| 2008/0055285 A1 * | 3/2008 | Ishikawa | | G09F 21/045 345/204 |
| 2009/0304507 A1 * | 12/2009 | Dehlsen | | F03D 1/0675 416/87 |
| 2010/0132234 A1 * | 6/2010 | Winkler | | F03D 3/005 40/431 |
| 2010/0260603 A1 | 10/2010 | Dawson et al. | | |
| 2010/0266412 A1 * | 10/2010 | Barber | | F03D 1/0666 416/147 |
| 2012/0070275 A1 * | 3/2012 | Presz, Jr. | | F03D 1/04 415/208.1 |
| 2012/0242084 A1 * | 9/2012 | Agtuca | | F03D 1/0675 290/44 |

\* cited by examiner

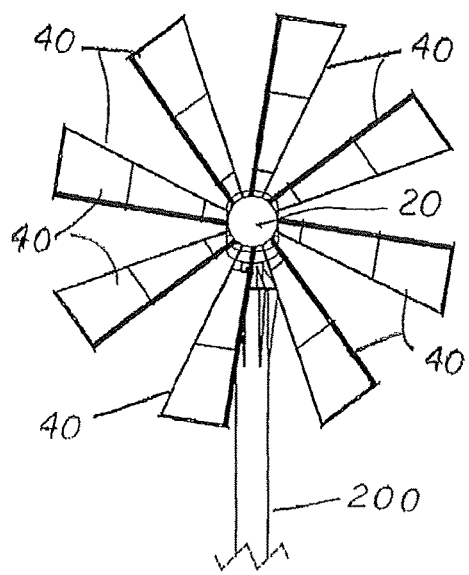
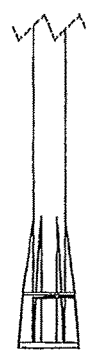
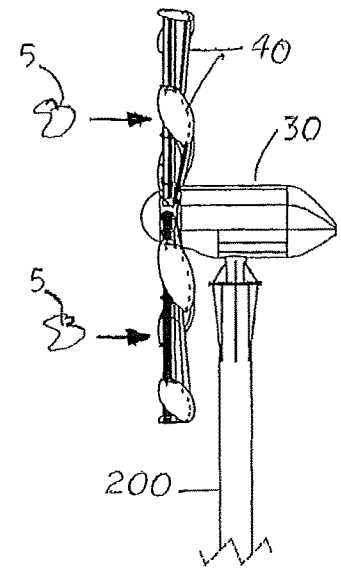
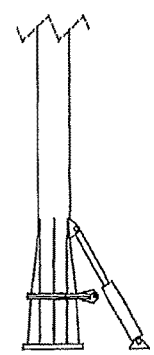
FIG. 7
FIG. 8
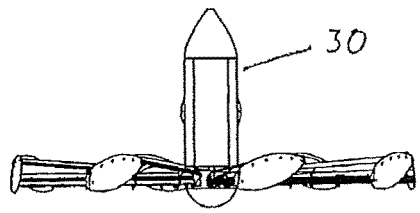
FIG. 9

ADVERTISING HORIZONTAL AXIS WIND GENERATOR

This utility patent application contains subject matter based on U.S. utility patent application Ser. No. 14/896,478 filed on Dec. 7, 2015 which is a 371 application on PCT/US14/41605 filed on Jun. 24, 2014 which claims the filing date benefit of U.S. provisional patent application 61/832,574 filed on Jun. 7, 2013.

BACKGROUND OF THE INVENTION

1. Field of the Invention

This invention pertains to wind generators, and more specifically to wind generator systems that use lightweight blades.

2. Description of the Related Art

It is well known that hills, valleys, trees and buildings affect the velocity of the wind, the wind's direction and turbulence. Most wind power systems are operated in open rural regions with little or no obstructions and few nearby neighbors. The systems include large nacelles with large hub assemblies. The hub assemblies which typically include two to three long solid blades are mounted on the end of a tower that holds them a sufficient elevation above the ground to reach 'clean' or low turbulence wind.

Large wind power systems found in the prior art typically use high RPM, low torque synchronous generators the produce electricity when the sustainable winds are within a narrow range of velocities. Because such generators require high input shaft velocities, gear boxes are placed between the hub assemblies and the generators. When the velocity of the wind is below the desired velocity range, the hub assemblies are disconnected from the generators. When the wind velocity is above the desired velocity range, the blades are rotated or furled to allow a greater percentage of the wind to flow in between the blades and thereby reduce rotation. In high velocity winds, a dynamic brake may be used to reduce or stop rotation.

High torque, low RPM, asynchronous generators, on the other hand produce electricity at lower RPMs. The amount of electricity produced by asynchronous generators is determined by the generator shaft's RPMs and the amount of torque applied to the shaft. The shaft's RPMs and the torque are determined in part by the number of blades on the hub assembly and the surface area of each blade.

The swept area is the area of a circle the blades of a wind generator create when rotating. The greater the swept area, the greater energy can be captured from the wind and more electrical energy can be produced.

The power produced by the blades on a wind generator system, is the product of shaft RPM speed and torque. To transfer power, a rotating shaft can operate either at high speeds and low torque, or at low speeds and high torque. As the number and lengths of the blades on a hub assembly increases, the hub's RPMs decrease and the torque increases. Conversely, as the length of the blades decrease, the hub's RPMs increase and the torque decreases.

The swept area of a horizontally aligned wind turbine is determined by the equation: $\pi \times r2$. When the swept area is evenly divided into concentric rings, the swept area of the outer rings are greater than the swept areas of the inner rings. Because the power of the wind (P) at a velocity (V) is determined by the equation $P=(\frac{1}{2}) \times (\pi) \times (\text{Air Density}) \times (V)$, turbines generators that use blades with a fixed length are best suited for locations with constant, moderate winds. Most locations are exposed to irregular, variable winds.

What is also needed is a wind generator system that uses lightweight blades that longitudinally adjust their lengths to increase or decreasing the swept area enabling it to operate more efficiency in low wind conditions and protect the wind generator in high wind conditions.

What is also needed is a wind generator system that uses lightweight blades that can also change their surface areas.

SUMMARY OF THE INVENTION

A wind generator system with a plurality of lightweight, surface area adjustable airfoil/sail blades. Each blade is triangular or wedge shape with a narrow inner edge and a wide outer edge. Each blade includes an inner frame connected to a rigid mast that extends radially from a hub assembly. Each blade includes a curved outer skin layer that extends over the inner frame and configured into air foil shape with a large curved leading edge and a thin trailing edge. The outer skin layer is secured along its leading edge and removeably attached along its trailing edge to a lightweight internal frame. Coupled to the outer skin layer is a first linear actuator that when activated, causes the outer skin layer to fold or unfold thereby changing the blade's surface area. The internal frame may include a second linear actuator and a telescopic mast over which the blade slides to increase or decrease the sweep area of the blades. Wind or electrical sensors are coupled to the mast and the retractable cable to automatically control the sweep area and the surface areas.

The wind generator includes a wind generator connected to a hub assembly that uses a plurality of lightweight, high efficiency, hybrid airfoil/sail blades. The hub assembly includes three to eight, blade mounting surfaces each attached to a radially extending blade. The blades are wedge-shaped and evenly distributed radially around the hub assembly and configured to create gaps between the blades. Each blade has an airfoil profile with a curved outer skin layer with a large curved leading edge and a flat trailing edge, similar to an airfoil. The outer section of each blade has a greater surface area than the inner section. The outer skin layer is securely attached to along its leading edge to a lightweight internal frame. The outer skin layer's trailing edge is detachable to the opposite edge of the lightweight internal frame. Each blade includes a transversely aligned inner base cap and a transversely aligned outer end cap. Mounted on the outer end cap are optional louvers. Each blade is oriented so their outer skin layer faces downwind and the angle of attack is slightly off center the blade to 'cup' or capture the wind similar to a sail. Each blade is also oriented with an angle of attack slightly offset from the blade's rotation path or swept area Each blade is oriented in the same direction so all of the blades rotate in the direction of their leading edges.

Each blade is triangular and wedge-shaped with a fixed in length and width. The outer section of each blade has a greater surface area than the inner sections. Each blade has an airfoil profile and oriented so that the large curved surface faces the direction of rotation. Each blade is also oriented with an angle of attack slightly offset from the blade's rotation path.

During operation, the hub assembly and blades are positioned in the wind so wind flows against the inside surface of the outer skin layer on each blade. A large portion of the wind then flows laterally over the inside surface and then exits along the blade's trailing edge. Because each blade has an airfoil shape and travels in a circle, air molecules travel over the outside surface of the outer skin layer thereby reducing drag.

Each blade acts as an airfoil that travels in a circle around the hub and as a sail to capture the energy of wind that flows perpendicularly to the blade's transverse axis. During use, wind flows against the inside surface of the blade's outer skin. Because the lead edge of the skin is fixed to the inner frame and curves inward, and because the outside edge of the outer skin layer is covered by an end cap perpendicularly aligned with the blade's longitudinal axis, the wind capture by the blade escapes along the blade's trailing edge.

Each blade includes a lightweight inner frame comprising a longitudinally aligned mast, a plurality of fixed curved ribs spaced attached to the mast. The ribs are perpendicular aligned with and extend rearward from the mast. Each blade may also include a rigid guide shield disposed adjacent to the mast. During use, a thin outer skin extends over the mast and the ribs. The outer skin is made of thin, durable flexible fabric, polyethylene or polyvinyl chloride film. The outer skin can be clear, painted or include advertising indicia displayed on one surface.

Each blade includes a first linear actuator coupled to the outer skin layer. During use, the first linear actuator is selectively controlled to fold or unfold the outer skin layer over the inner frame and thereby change the surface area of blade. The first linear actuator is coupled to wind speed sensors, electrical output sensors or a programmable logic controller.

In one embodiment, the mast is telescopically adjustable in length over which the blade slides to change the sweep area. In one embodiment, a second linear actuator is connected to the mast which causes the mast to extend and reposition the blade at a greater radius from the hub. The second linear actuator may also be coupled to wind speed sensors, electrical output sensors or a programmable logic controller to automatically adjust the sweep area.

When the blades are exposed to light to moderate high winds, the wind speed sensors or electrical output sensors automatically activate the first linear actuator to unfold (expand) or fold up (retract) the outer skin layer to adjust the blades total surface areas. If the blades are exposed to excessive high winds, then the sensors activates the second linear activators coupled to the mast cause them to retract. In severe high winds, the trailing edges of the blades are designed to automatically detach and release from the internal frame and prevent damage to the blade and the hub assembly.

As stated above, the end cap may also include one or more louvers that automatically closes at lower wind speeds. The louvers are coupled to motors and wind speed sensors that automatically open the louvers during sudden gusts of moderate to high winds to allow wind captured by the blade to partially or completely flow over the end of the blade to prevent automatically release of the trailing edges.

DESCRIPTION OF THE DRAWINGS

FIG. 7 is a front view of another horizontal axis wind generator system that uses eight hybrid airfoil-sail blades.

FIG. 8 is a side elevational view of the generator shown in FIG. 7.

FIG. 9 is a top plan view of the generator shown in FIGS. 7 and 8.

DESCRIPTION OF THE PREFERRED EMBODIMENT(S)

Figure 1:
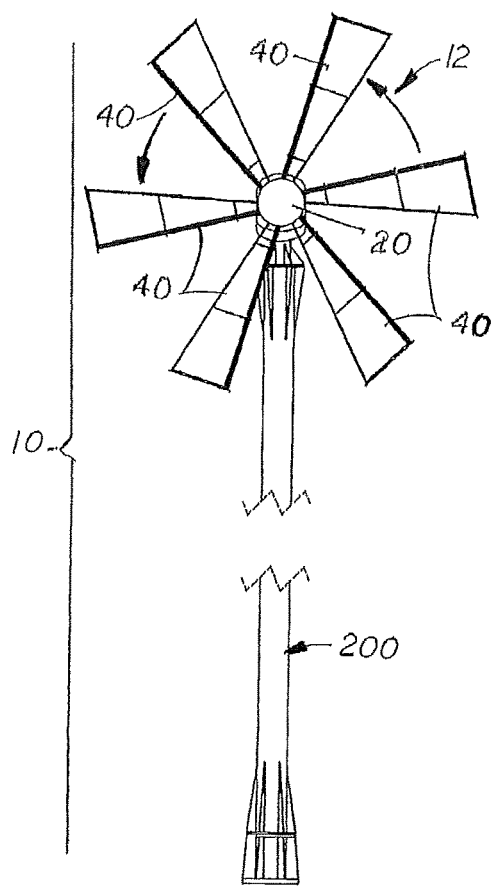
FIG. 1 is a front view of a horizontal axis wind generator system that uses six lightweight, high torque hybrid airfoil-sail blades attached to a hub assembly.
Figure 2:
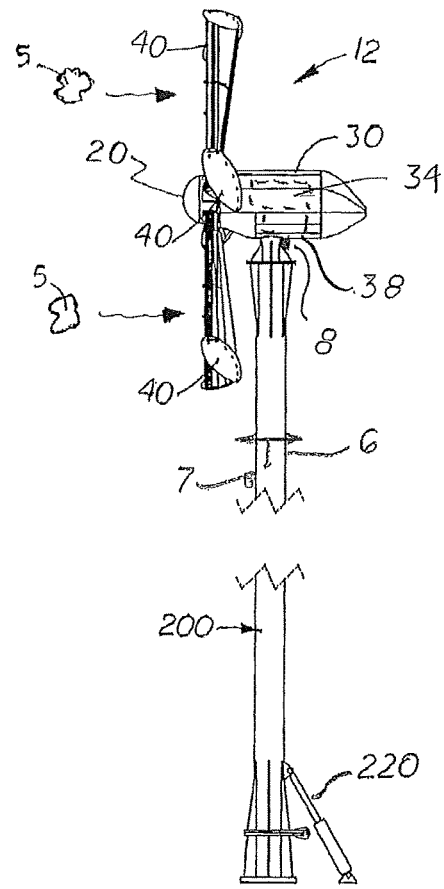
FIG. 2 is a side elevational view of the generator system shown in FIG. 1.
Figure 3:
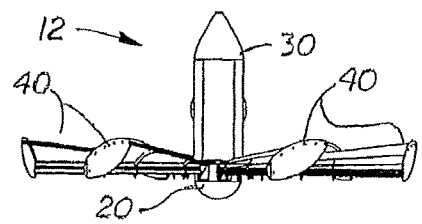
FIG. 3 is a top plan view of the generator system shown in FIGS. 1 and 2.
Figure 4:
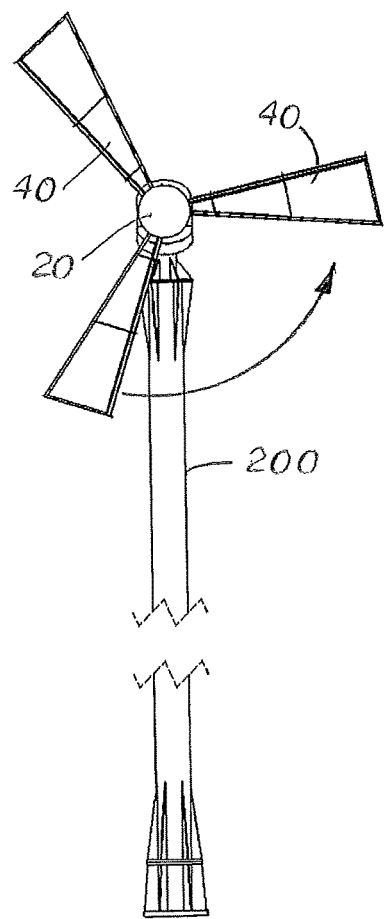
FIG. 4 is a front view of another horizontal axis wind generator system that uses three hybrid airfoil-sail blades.
Figure 5:
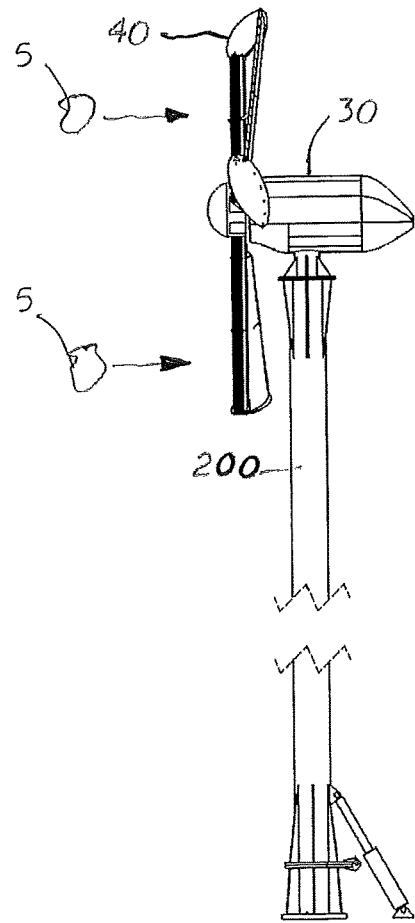
FIG. 5 is a side elevational view of the generator system shown in FIG. 4.
Figure 6:
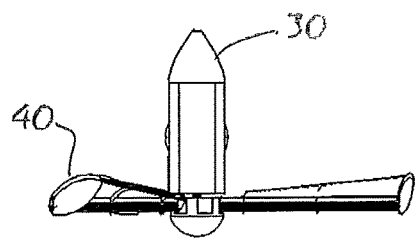
FIG. 6 is a top plan view of the generator system shown in FIGS. 4 and 5.
Figure 10:
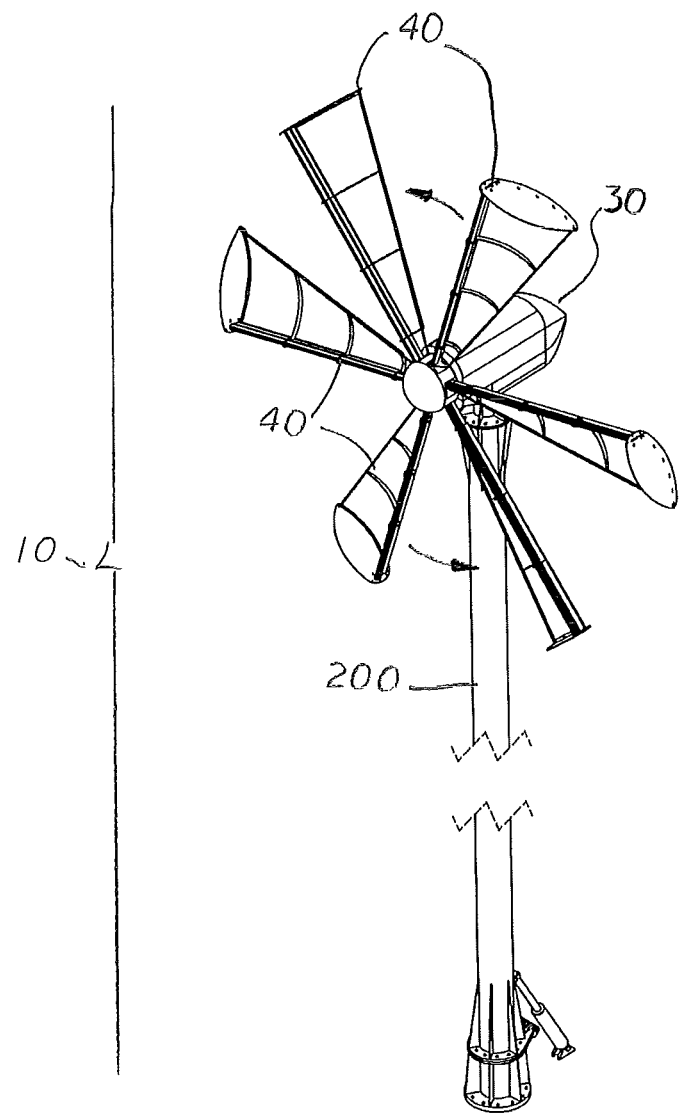
FIG. 10 is a perspective view of the horizontal generator system that uses five hybrid airfoil-sail blades.

Referring to the accompanying FIGS. 1-41, a low wind, lightweight horizontal axis wind generator system 10 with a plurality of lightweight hybrid blades 40 the function as a sail to capture the wind and acts as an airfoil when rotating.

The blades 40 are attached to a lockable or non-lockable hub assembly 20 that connects to direct or indirect drive wind generator system 10. The generator system 10 includes a nacelle 30 housing a wind generator 34 all mounted on top of a lightweight tower 200. Connected to the wind generator 34 is a hub assembly 40. The system 10 may include a hydraulic lift 220 that moves the tower 200 from a horizontal position to a vertical position when winds are sufficiently strong. In the embodiment shown in the Figs, the nacelle 30 is coupled to an optional motor 38 that rotates the nacelle 30 and the hub assembly 20 over the end of the tower 200 so the blades 40 are perpendicularly aligned with the direction of the wind 5 at all times. Directional and wind speed sensors 6 and 7 are provided that constantly measure the direction and velocity of the wind 5.

FIGS. 1-3, 4-6 and 7-9 show different configurations of the system 40 with six, three, and eight blades 40, respectively, attached to the hub assemblies 20. By using different number of blades, the solidity of the system 10 may be adjusted for different wind conditions.

Figure 11:
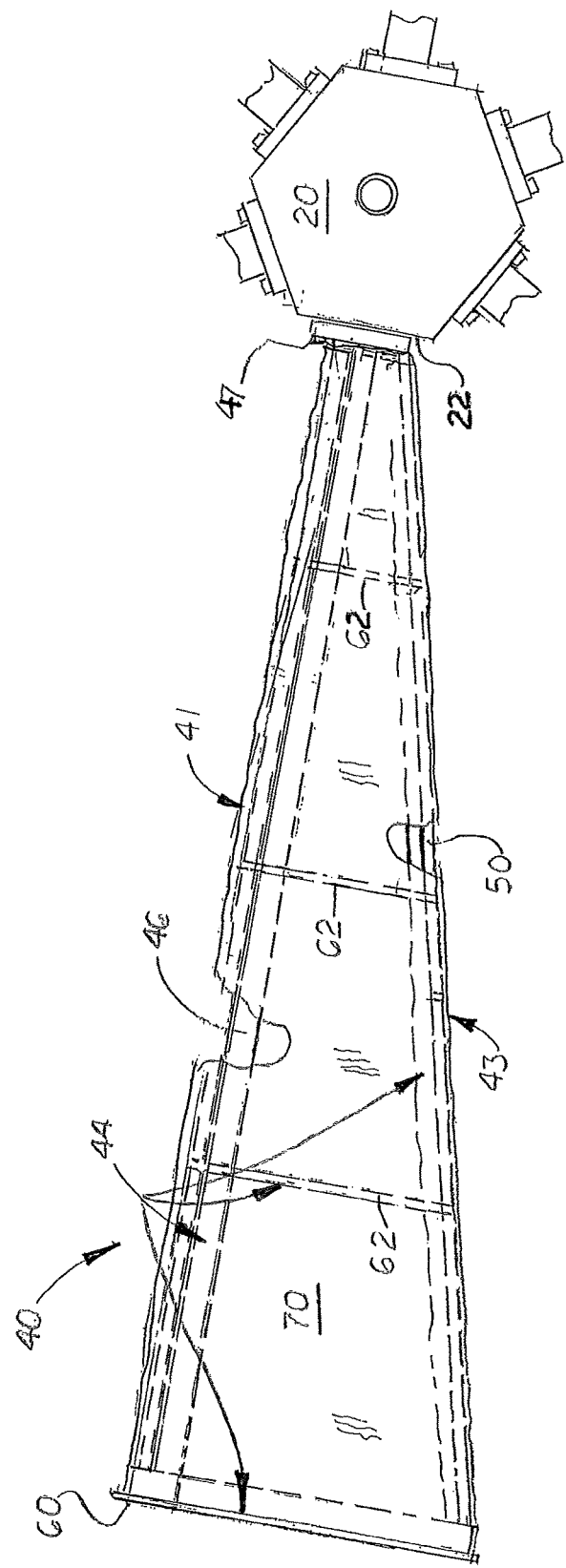
FIG. 11 is a front elevational view of a hybrid airfoil-sail blade attached to a hub assembly showing the inner frame surrounded on its downwind side by an outer skin layer.

A key aspect of the invention is using plurality of lightweight, relatively high surface area, hybrid airfoil-sail blades 40 each designed to capture the energy from the wind similar to a sail, allows it to escape primarily the trailing edge of the blade 40 and rotate around the hub assembly 20 with little or no resistance similar to an air foil. As shown in FIG. 11, each blade 40 includes an outer skin layer 70 maintained in an airfoil profile that is inverted to form 'cup' the wind similar to a sail. Because the blades 40 are lightweight and form a cup, they have relatively high surface areas that the wind 5 flows against. Because each blade 40 has a relatively large surface area, less torque is required for their rotation and the blades 40 rotate at relatively low wind speeds, (i.e. 2 to 3 mph). By adjusting the length and the width of the blade 40, the surface area of each blade 40, the torque output may be adjusted to meet the needs of the wind generator 34. Also, when the wind speed decreases, the rotation of the blades 40 is reduced immediately. Each blade 40 includes a trailing edge 'auto-release' feature, an end plate wind flow control feature, and a simultaneous release feature that prevents catastrophic damage caused by high gusts. Also disclosed herein are sub-systems that enable the surface areas of each blade to automatically adjust and the sweep area of the blades to automatically adjust according to wind conditions.

Referring again to FIG. 11, each blade 40 is similar to the lightweight blade shown in pending U.S. patent application Ser. No. 13/824,243 filed on Sep. 8, 2013 which is based on PCT/US2012/55827) and now incorporated by reference. The blade 40 includes an internal frame 44 is wedge-shaped and includes a large, tubular leading edge support member 46 and a narrow, trailing edge support member 50. Attached to the proximal ends of the support members 46, 50 is a hub mounting plate 47. Attached to the distal ends of the support members 46, 50 is a transversely aligned end plate 60. Disposed in between the mounting plate 47 and the end plate 60 are one or more transversely aligned wind spars 62. The support members 46 and 50 and the mounting and end plates 47, 60 are made of aluminum.

The hub assembly 20 is also made aluminum and includes three to eight flat mounting surfaces 22. The mounting surfaces 22 are evenly spaced apart over the outside surface of the hub assembly 20. Attached to the mounting surface 22 is the mounting plate 47 on a blade 40 that securely holds the blade 40 radially outward.

Figure 12:
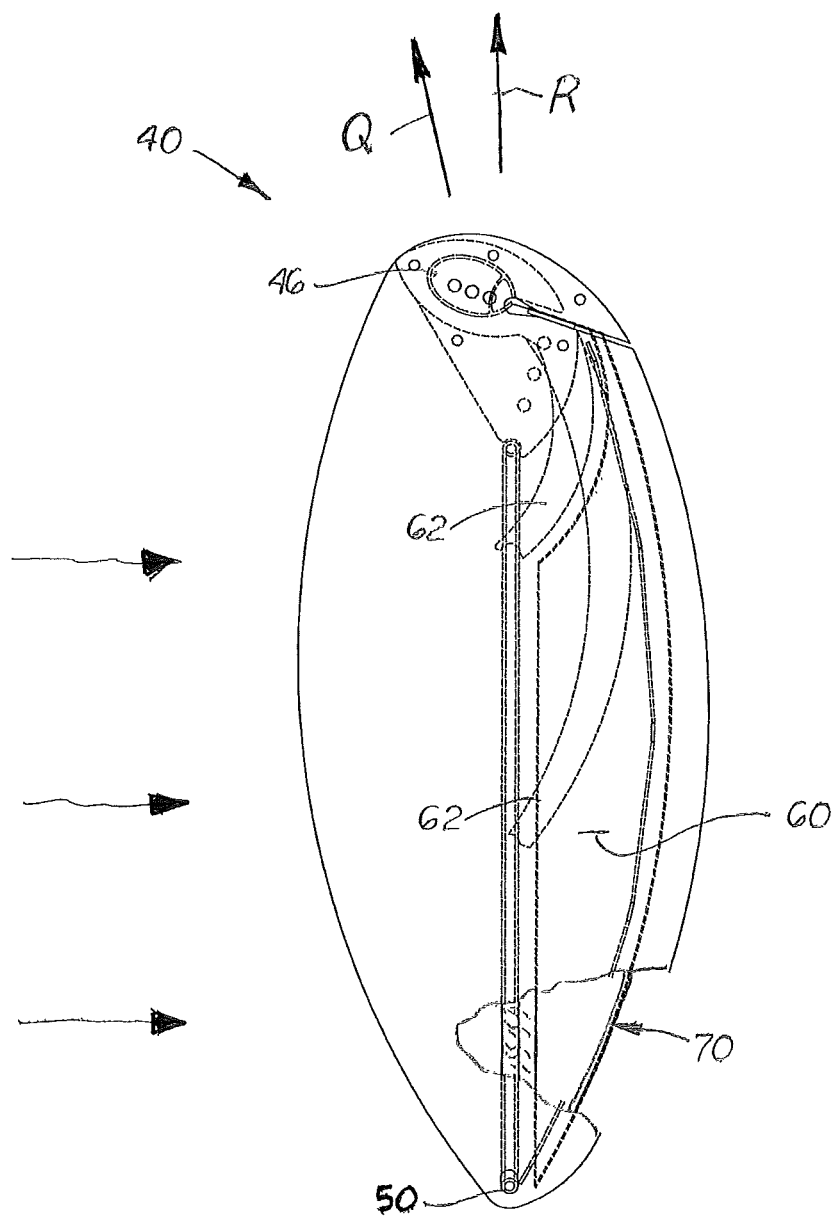
FIG. 12 is a side elevational view of the blade shown in FIG. 11 with a portion of the end cap partially removed.
Figure 13:
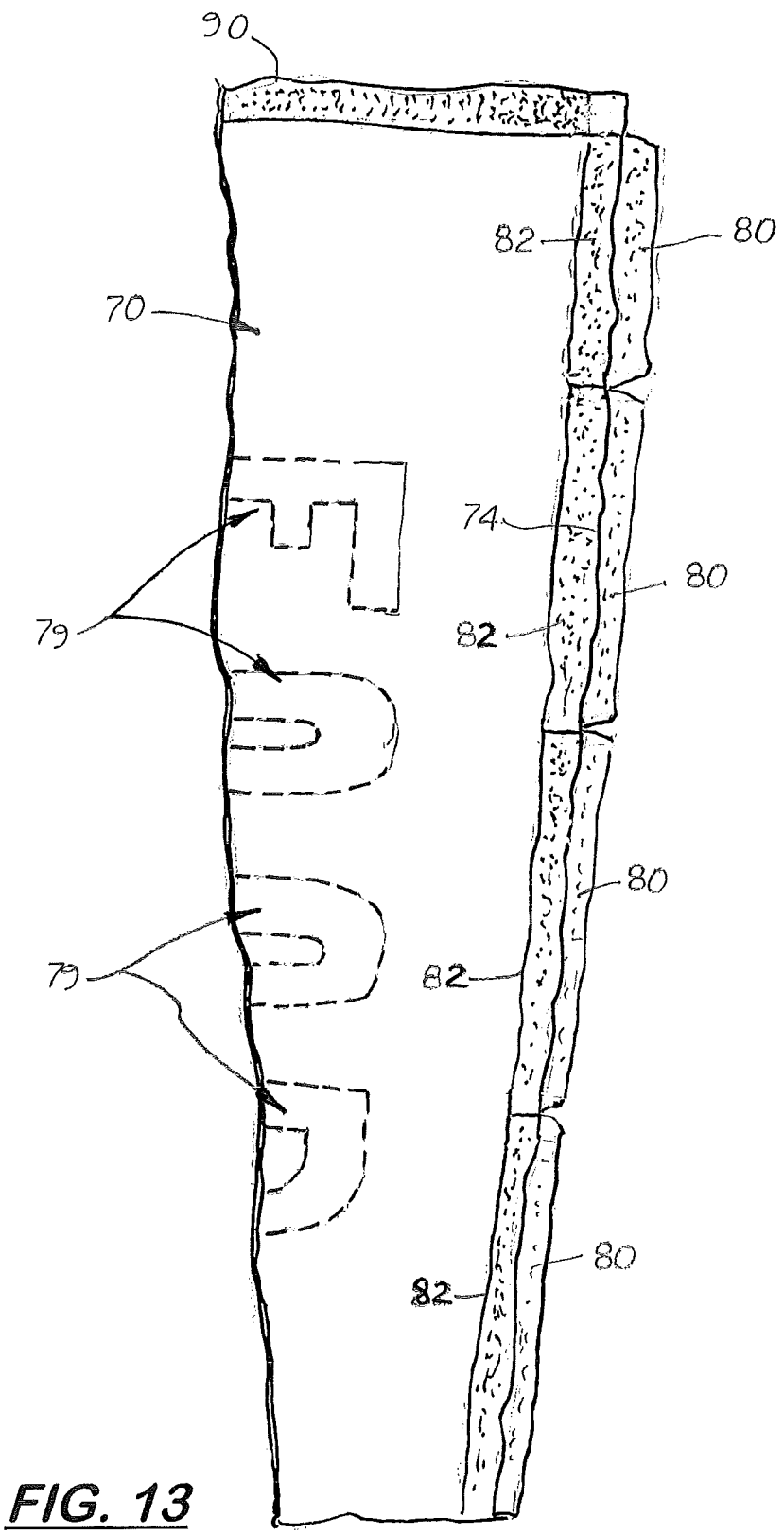
FIG. 13 is a front elevational view of the trailing edge of the outer skin layer showing the hook and loop connecting strips that wrap around the trailing edge support member to removably attach the trailing edge to the inner frame.
Figure 14:
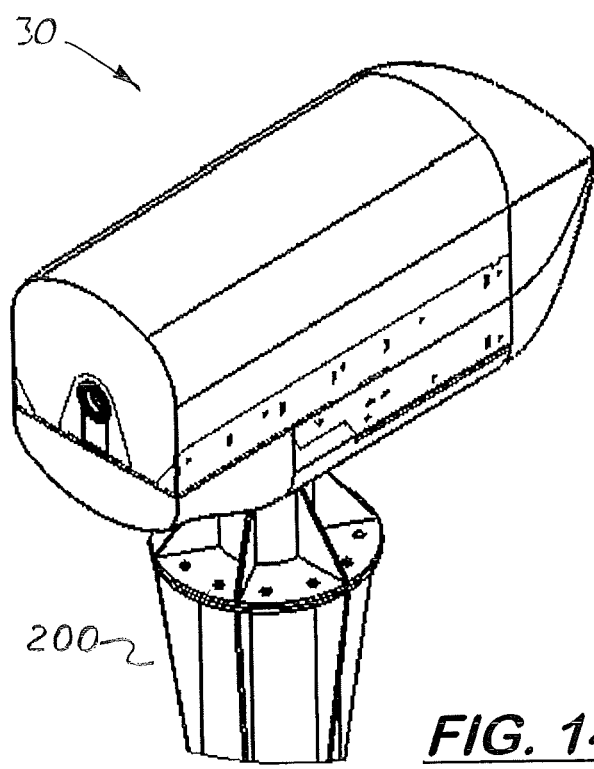
FIG. 14 is a perspective view of the nacelle with the hub assembly and blades removed.
Figure 15:
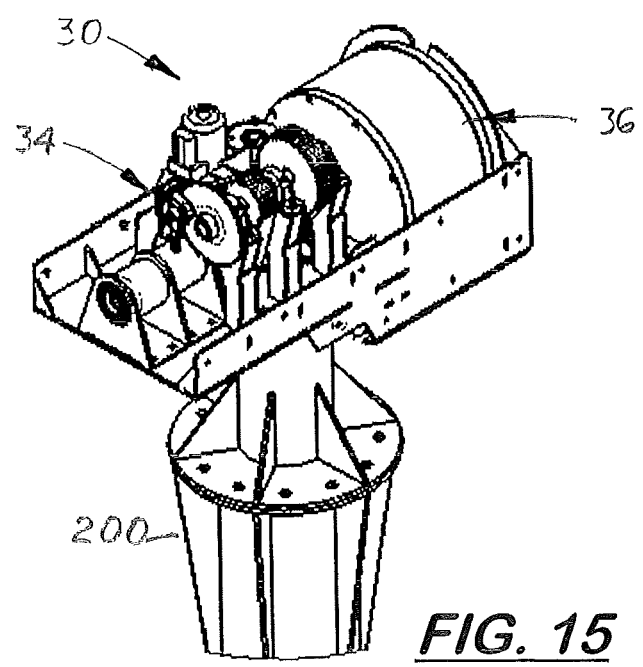
FIG. 15 is a perspective view of the nacelle shown in FIG. 14 with the outer cover removed.
Figure 17:
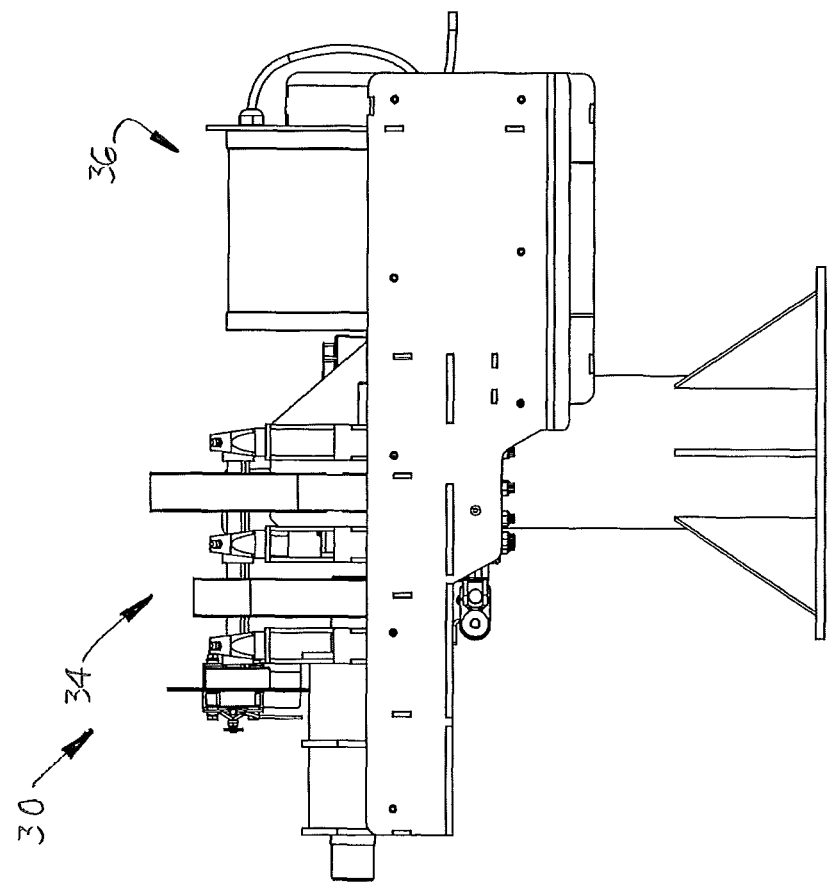
FIG. 17 is a right side elevational view of the wind generator mounted on the nacelle shown in FIG. 16.
Figure 16:
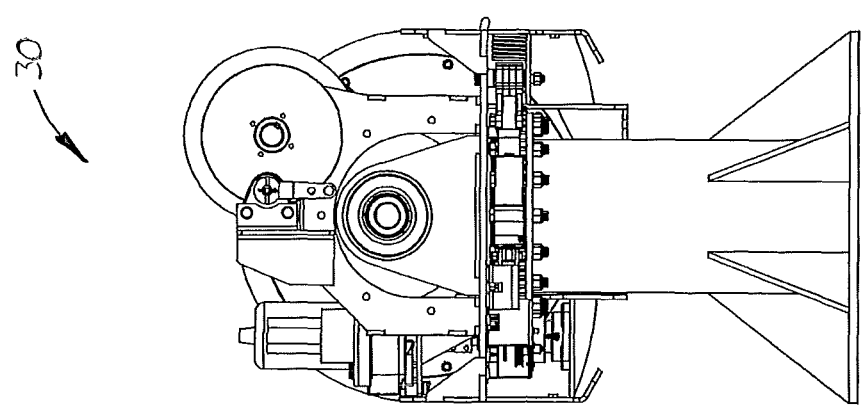
FIG. 16 is a front view of the gear box and the wind generator mounted on the nacelle.
Figure 18:
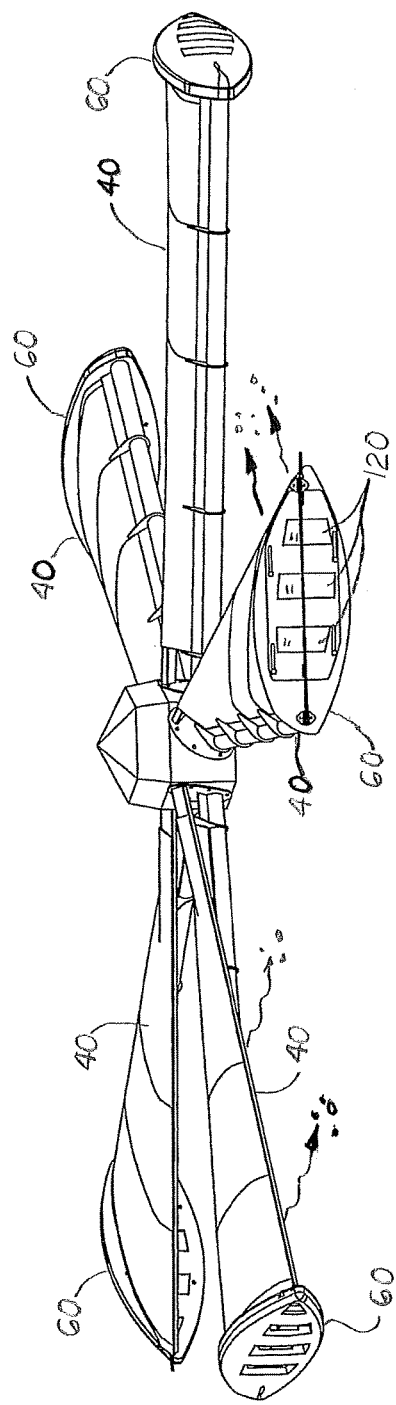
FIG. 18 is a side perspective view of the hub assembly with five hybrid blades each with closed louvers formed on the end plates.
Figure 19:
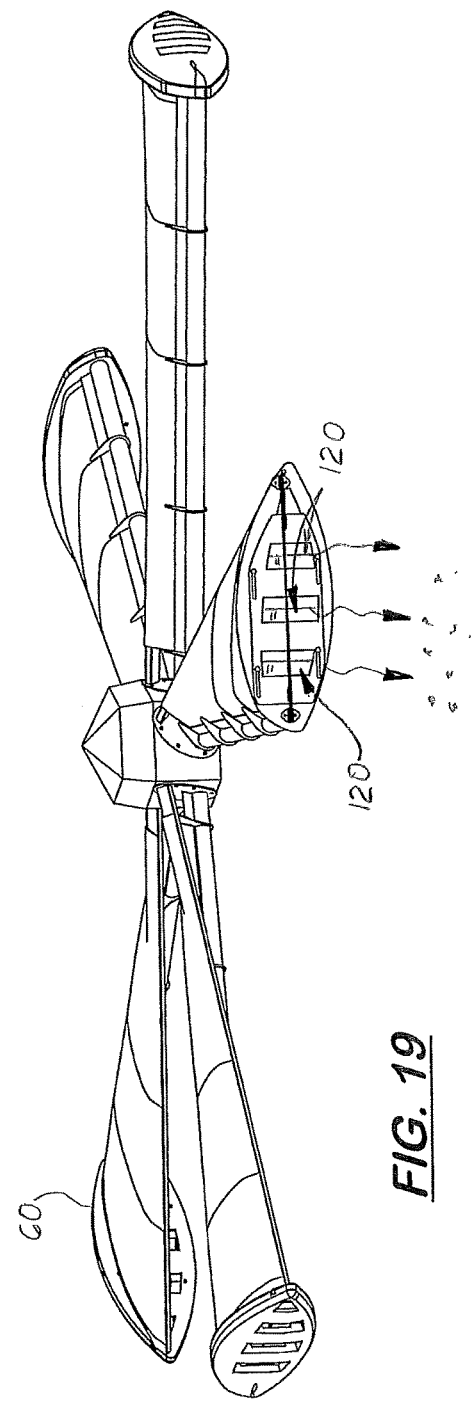
FIG. 19 is a side perspective view of the hub assembly with five hybrid blades each with opened louvers on the end plates that allow wind to pass through the end plate.
Figure 20:
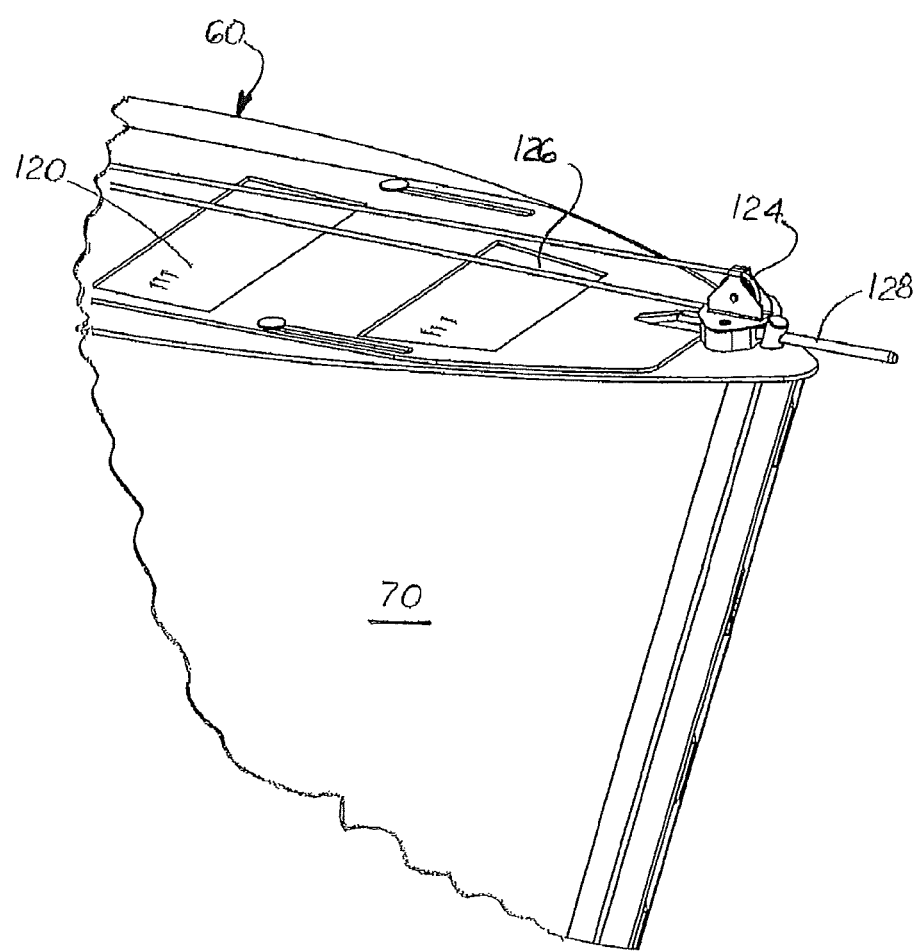
FIG. 20 is a partial perspective view of a hybrid blade showing the end plate with the louvers closed and connected to a connecting rod controlled by pulley and cable.
Figure 21:
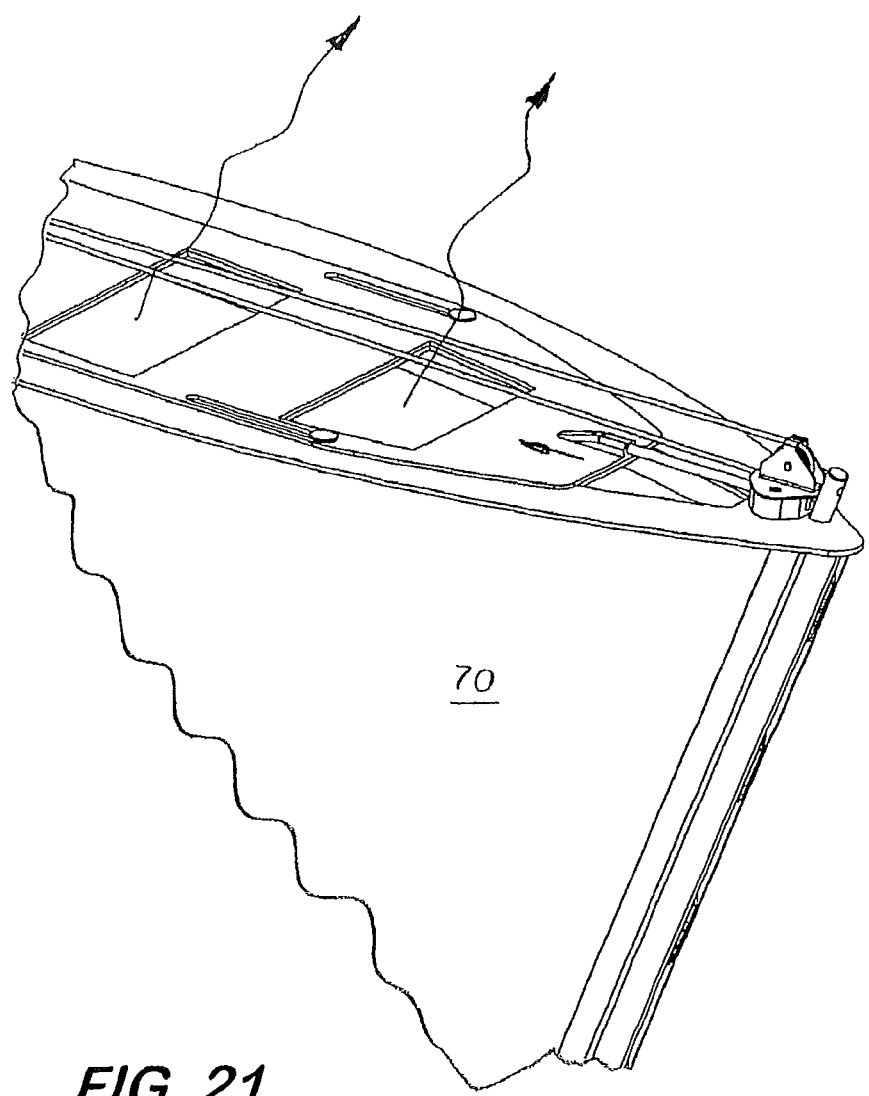
FIG. 21 is a partial perspective view of a hybrid blade showing the end plate with the louvers in an open position to allow wind to escape through the end plate.

Attached over the back surface of the internal frame 44 is a thin outer skin layer 70. When attached to the internal frame 44, the outer skin layer 70 simulates the top surface of an airfoil. Each blade 40 is oriented on the hub assembly 20 so the outer skin layer 70 faces downwind and the leading large curve surface of the blade 40 travels along the path of rotation (denoted by the letter 'Q' in FIG. 12. Each blade 40 is also rotated on the hub's mounting surface 22 so its angle of attack, denoted by the letter 'R' in FIG. 12 is slightly offset from the path of rotation 'Q'.

The internal frame 44 holds the outer skin layer 70 in an airfoil/sail configuration. The leading edge of the outer skin layer 70 is affixed to the frame's tubular leading support member 46. The trailing edge of the outer skin layer 70 is removably attached to the frame's trailing support member 50. Each blade 40 as a relatively large surface area used to generate high torque needed to rotate the generator. As shown in FIGS. 1, 4, 7, and 10, a wedge-shape gap is formed between adjacent blades 40. The number of blades 40, the surface areas of each blade 40, and the surface area of the gaps are determined by the area's wind profile and the type and size of wind generator 34 used.

During operation, the hub assembly 20 rotates so that the cupped or inside surface of each blade 40 faces into the wind 5. A large portion of the wind 5 is captured by the curved section of the blade 40, the end cap 60, and rigid wind spars 62 and redirected laterally over the trailing edge of the blade 40. The wind spars 62 also keep the wind 5 from flowing outward to the outer sections of the blade 50. As each blade 40 rotates, a small portion of the wind travels over the blade's leading edge 41. The dual movement of the wind 5 over the blade 40, creates a highly efficient blade system the captures a higher percentage of wind energy.

The end caps 60 are flat planar structures transversely aligned on the outside surface of each blade 40. They are supported by the distal ends of the leading edge support member 46 and the trailing edge support member 50. In the preferred embodiment, the end caps 60 have an airfoil profile slightly larger but has the same cross-sectional profile as an airfoil. During operation, the end caps 60 prevent wind from moving longitudinally over the end of the blade 40 directing it over the trailing edge 43.

In high wind events, the trailing edges 73 of the outer skin layer 70 are designed to automatically release preventing damage to the blade 40 or hub assembly 20. After the trailing edges are released, the trailing edges 73 of the outer skin layers 70 must be manually reconnected. To control activation of the automatic release feature, it may be desirable to allow wind 5 to escape over the end cap 60 of the blade 40.

The outer skin layer 70 is made of sail cloth material or durable polyethylene film or poly vinyl chloride film. The outer skin layer 70 may be transparent or painted and may include advertising indicia 79 printed thereon.

When a minor or small wind gust occurs, the wind 5 may cause the trailing edge 73 of the outer skin layer 70 to release. To prevent this, the end cap 60 may include one or more louvers 120 that close at lower wind speeds and automatically open at higher wind speeds. The louvers 120 are coupled to motors and wind speed sensors that automatically open the louvers 120 to allow wind to partially or completely flow over the end of the blade 40 to prevent automatically release of the trailing edges.

Using a wind generator as an advertising sign, is important because it allows the wind generator to generate advertising revenue when the winds are low to product electricity When the blade 40 includes advertising indicia 79 (see FIG. 13), the hub assembly 20 must be locked so the advertising indicia on a blade may be seen and to prevent rotation. The hub assembly 20 and nacelle 30 must also be locked so the indicia 79 on the blade 40 is within viewing distance of potential customers. In the preferred embodiment, the wind generator system 10 may include wind sensors 7 coupled to a hub assembly locking mechanism 8 that is automatically activated when the wind speeds are too low and automatically converting the wind generator system 10 into advertising signage.

In one embodiment, the leading edge of the outer skin layer 70 includes a beaded edge 74 that fits inside a slot 48 formed on the tubular leading support member 46. The trailing edge 72 of the outer skin layer 70 is attached to the trailing support member 50 via hook and loop connectors 80, 82. The hook and loop connectors 80, 82 are parallel and disposed longitudinally along the trailing edge of the outer skin layer 70 and loop around the trailer support member 50 during installation The outer sections of each blade 40 generates the high torque. During high winds, the outer sections of the blades 40 are first to auto-release. As the outer sections are released, the middle and inside sections are then sequentially released until the entire trailing edge 72 of the blade 40 is released. The leading edge or beaded edge 71 of the outer skin layer 70 remains attached to the leading support member 46. Various types of hook and loop connectors 80, 82 with different holding properties may adjust the holding or attachment strength so the trailing edges 72 release at different high wind speeds.

In some high wind events, not all of the hook and loop connectors 80, 82 on the trailing edges of the blades will release automatically. Blades 40 in an elevated position on the hub assembly 20 are exposed to greater winds and auto-release while blades 40 in the lower locations (or location not exposed to direct wind) remain connected. Auto releasing of some but not all of the blades 40 creates an imbalance on the hub assembly 20 that can cause damage. To prevent this unbalance from occurring, a simultaneous trailing edge release mechanism is provided along the trailing edge adjacent to the outer sections of the blades 40 that when activated, causes all of said trailing edges located along the outer sections of each blade to be disconnect from the internal frame. Because, the middle and inside sections typically release sequentially when the outer section of the blade 40 release, only the outer sections of the blades require the simultaneous release mechanism.

Figure 22:
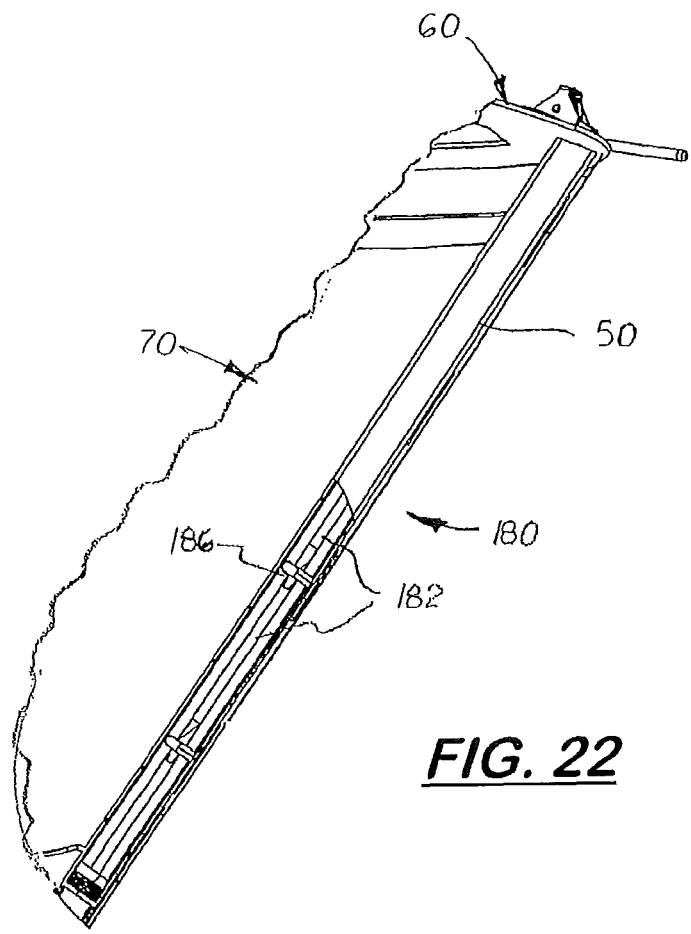
FIG. 22 is a side elevational view of the trailing edge of the outer skin layer and the blades inner frame showing a simultaneous trailing edge release mechanism that allows the trailer edge along the blades outer section to release.
Figure 23:
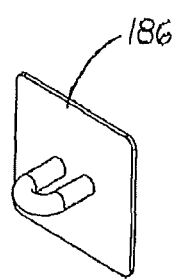
FIG. 23 is a perspective view of a grommet attached to the trailing edge of the outer skin layer.

The simultaneous trailing edge release shown in FIG. 22, includes a spring activated push-pull rod 182 along the trailer edge support member 50. The pull-pull rod 182 extends through grommets 184 attached and space apart along the trailing edge of the outer skin layer 70. The push-pull rod 182 extends through grommets 184 to attach to an outer skin layer 70 to the trailing support member 50.

Located on the end plate 60 is a pin 160 attached to release cables 162 that move the push pull rod 182 between blocking and releasing positions. When moved to a releasing position, the push-pull rod causes the rod 182 to release the grommets 184 enabling the trailer edge of the outer skin layer 70 to be released. In the preferred embodiment, the cables are connected to pulleys and motors in the hub assembly 20. The motors are coupled to the wind sensors 7 that monitor the wind for excessive wind speeds.

Figure 24:
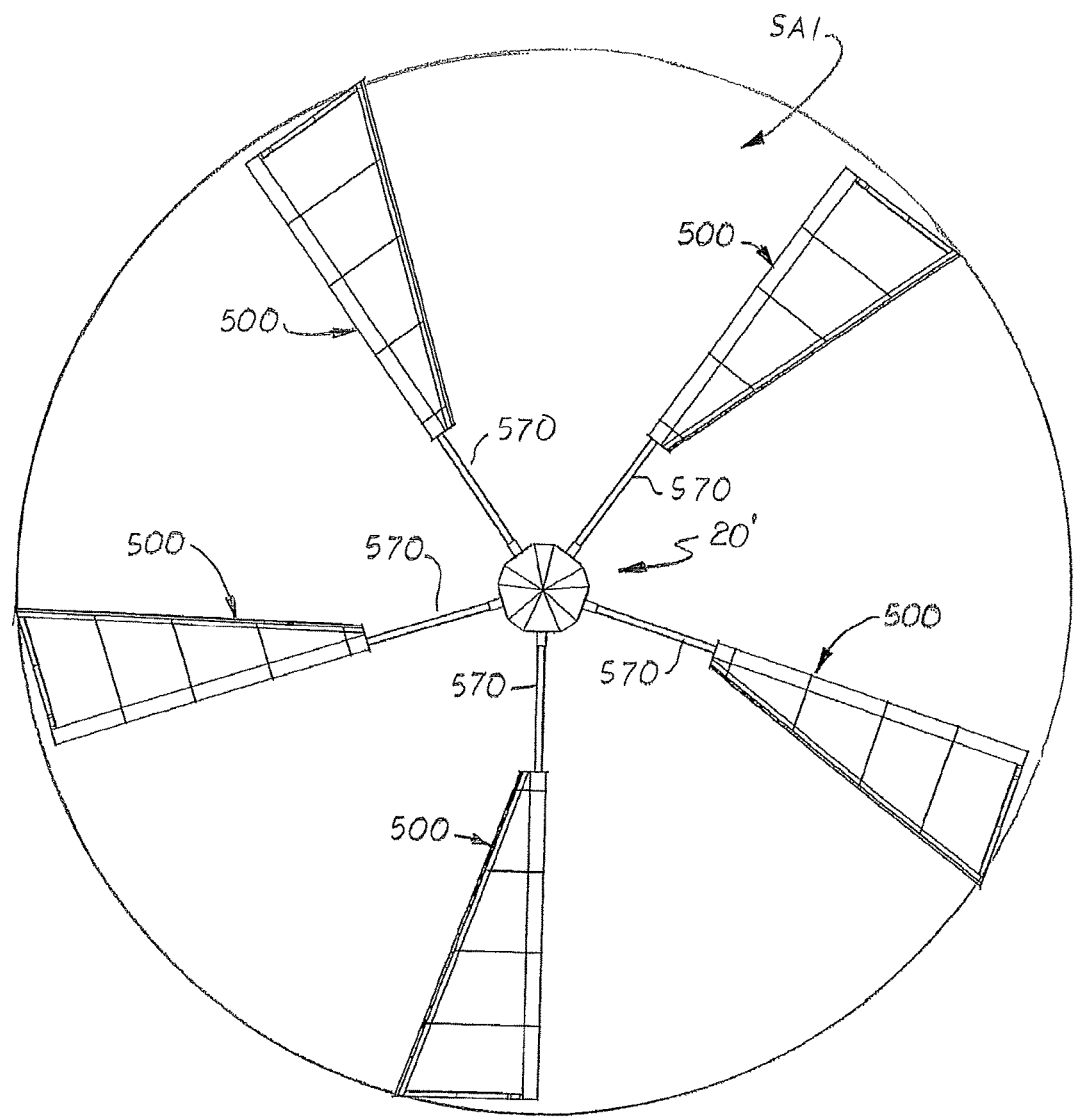
FIG. 24 is a front view of the horizontal axis wind generator with longitudinally adjustable blades showing each blade in an extended position.
Figure 25:
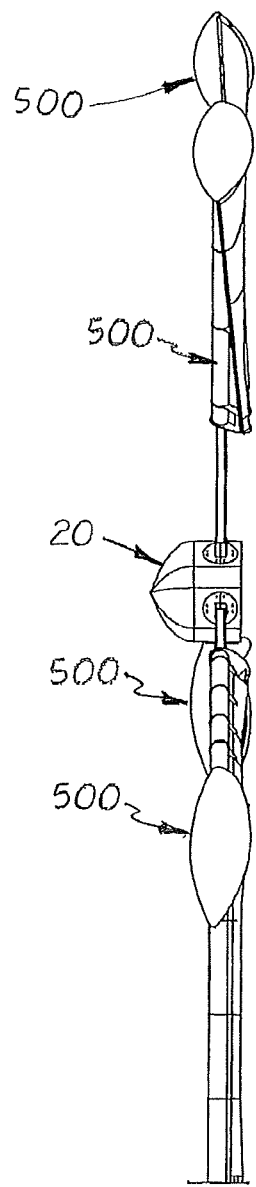
FIG. 25 is a side elevational view of the wind generator shown in FIG. 24.
Figure 26:
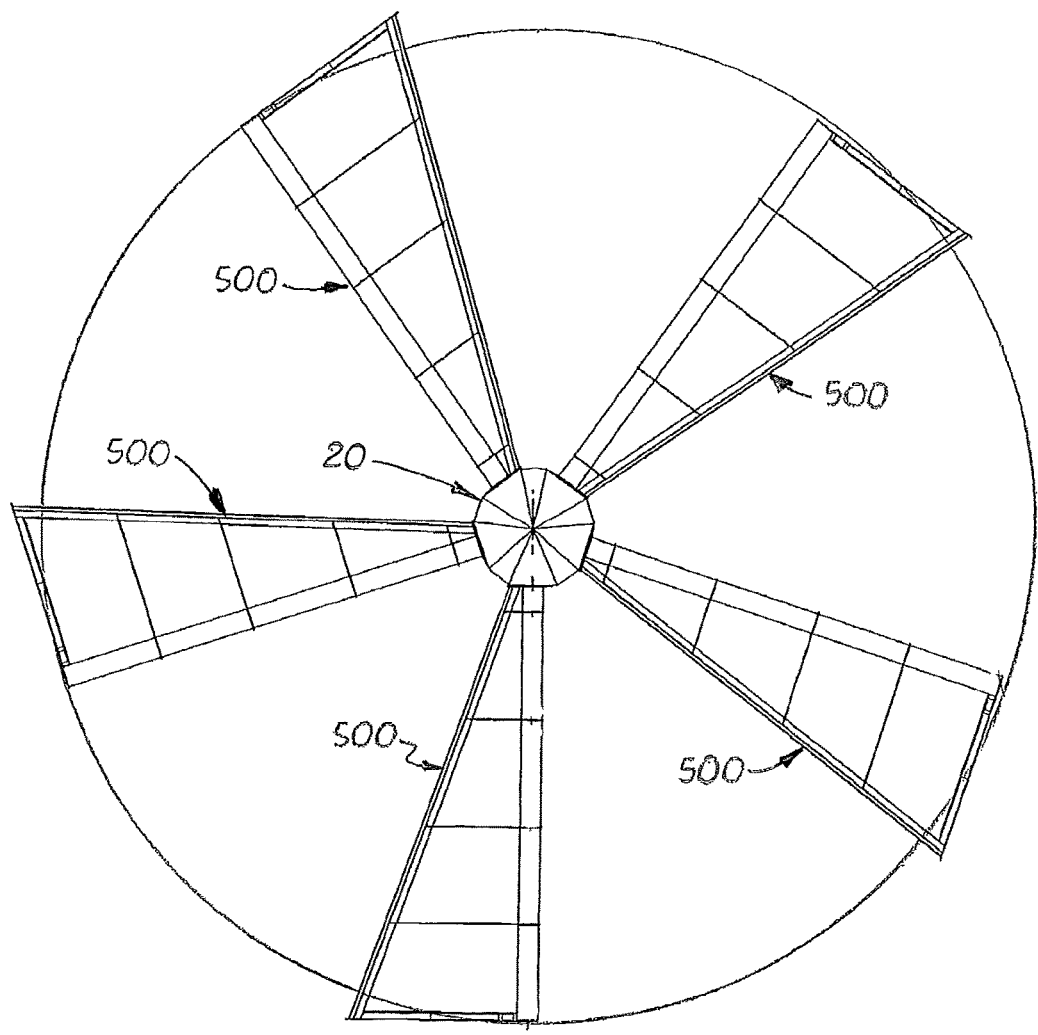
FIG. 26 front view of the horizontal axis wind generator shown in FIG. 24 with each blade shown in a retracted position.
Figure 27:
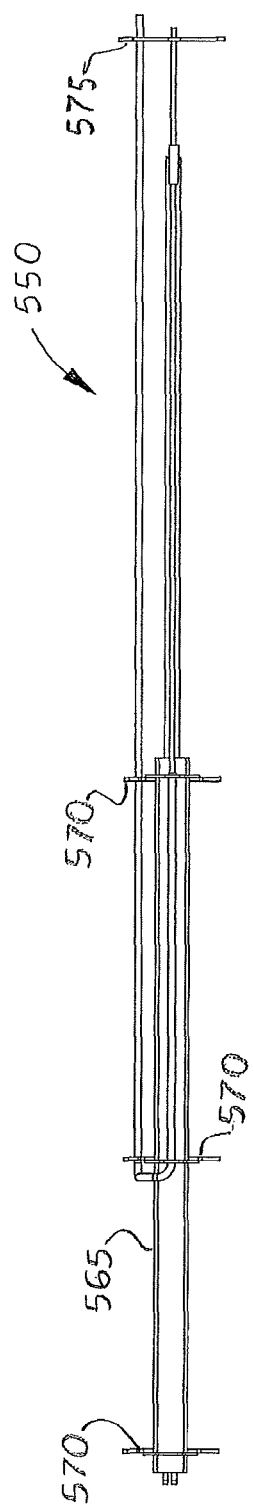
FIG. 27 is a top plan view of the first linear actuator attached with two brackets attached to the mast and a third bracket that attaches to a main tube on the blade (not shown)
Figure 28:
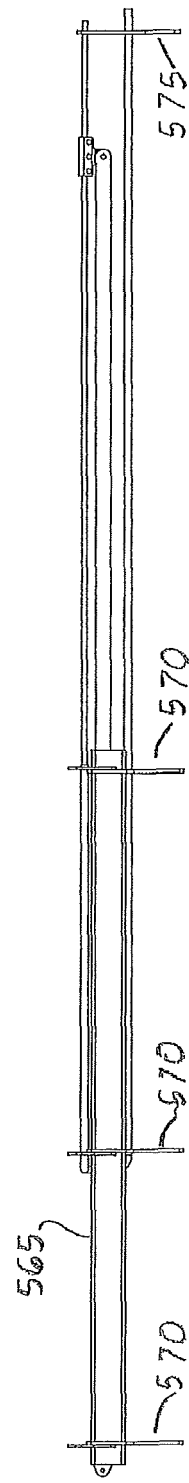
FIG. 28 is a side elevational view of the first linear actuator shown in FIG. 27.
Figure 29:
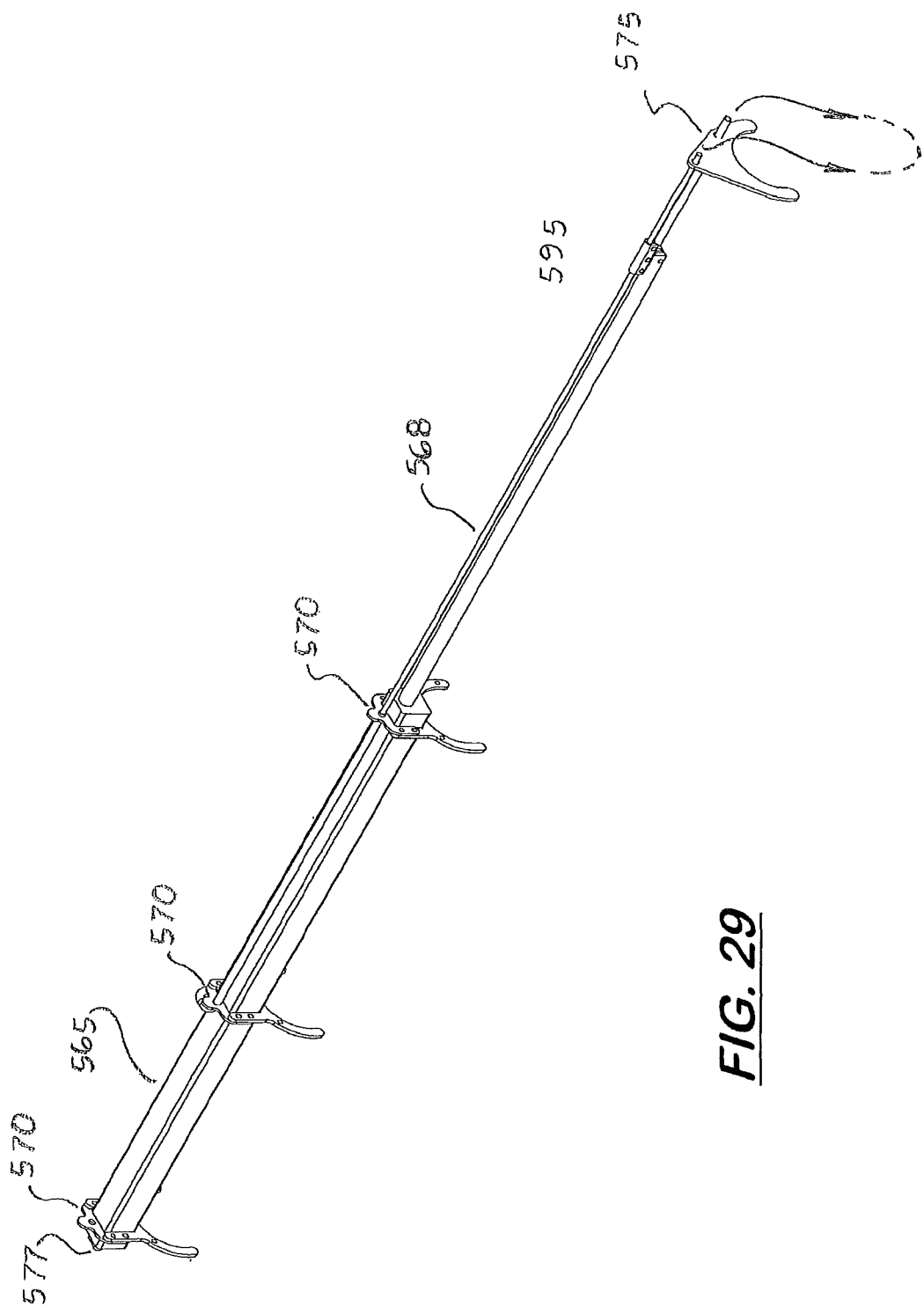
FIG. 29 is a perspective view of the first linear actuator.
Figure 30:
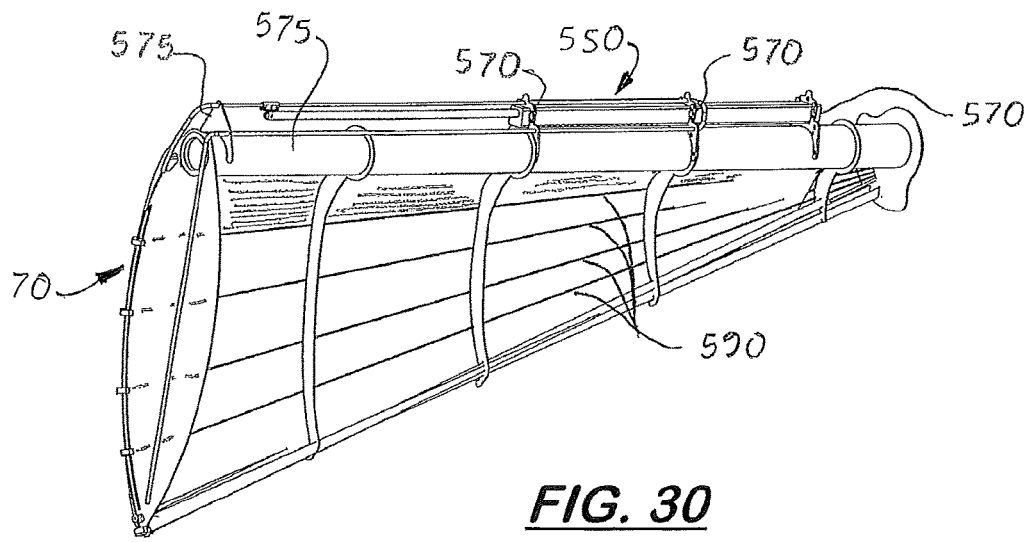
FIG. 30 is a perspective view of a blade showing the first linear actuator mounted on the mast.
Figure 31:
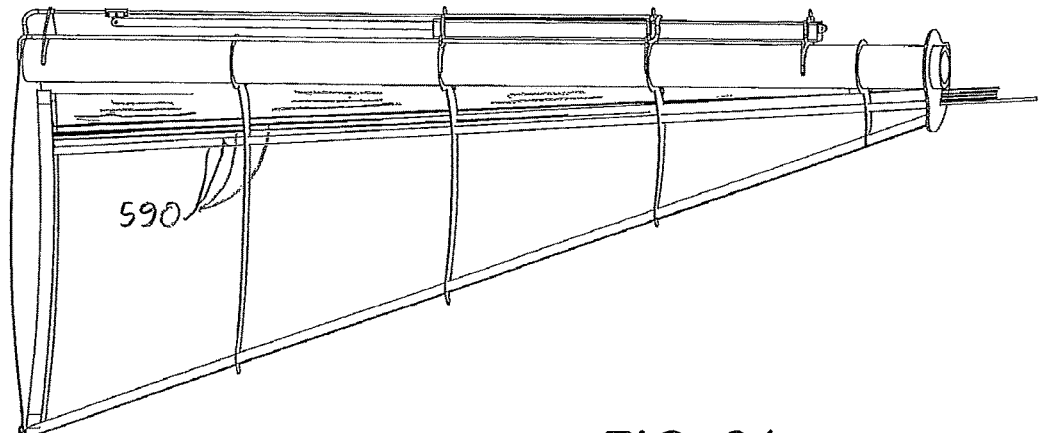
FIG. 31 is a side elevational view of the blade shown in FIG. 30.
Figure 32:
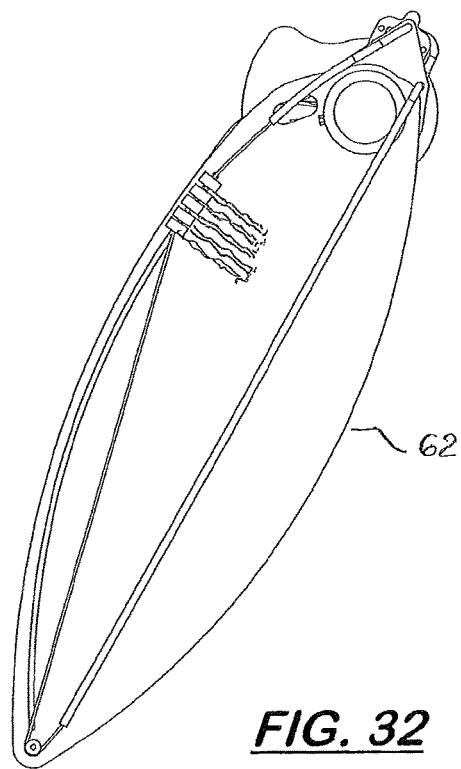
FIG. 32 is an end elevational view of a blade showing the end connector plate attached to the first linear actuator with the cable extend from the end of the connector plate and extending through five bushings attached to the outer skin layer and then around a pulley and back through protective sleeve and returned to the end connector plate.
Figure 33:
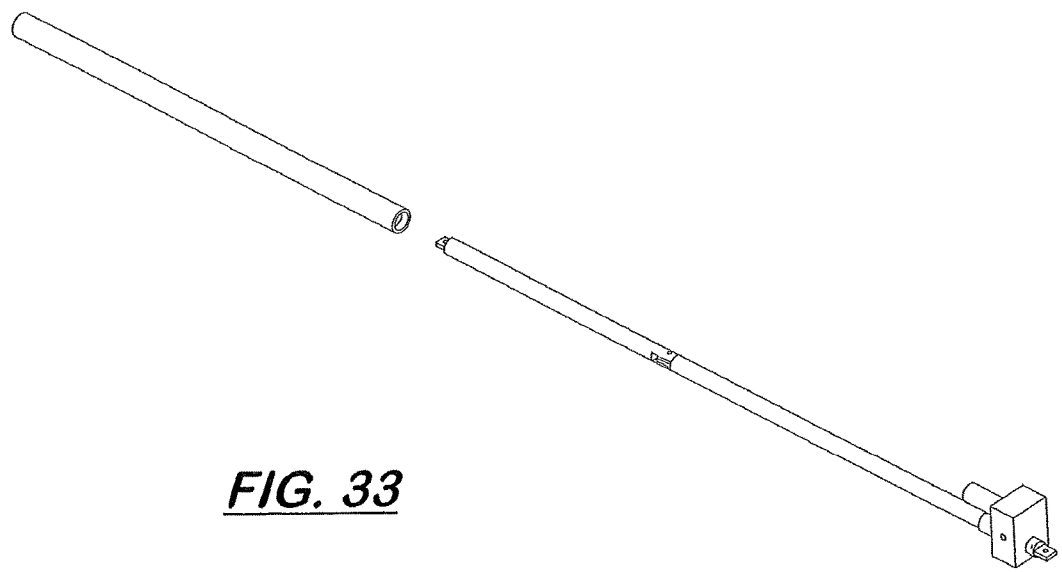
FIG. 33 is a perspective view of the first linear activator that includes a drive motor mounted over and coupled to first tube that connects to second and third tubes.

As discussed above, changing the sweep area of the blades 40 changes the amount of wind energy captured and converted into electrical energy. FIGS. 24-26 show an alternative embodiment of a hub assembly 20' with a plurality of longitudinally adjustable blades 500. FIGS. 24 and 25 show the blades 500 are mounted on a rigid mast 570 that extends radially from the hub assembly 20. During use, the position of the blades 500 may be changed and configured in an extended position with a large sweep area (denotes as SA1) and FIG. 26 shows the blades 500 in a retracted position and using a small sweep area (SA2).

In addition to adjusting the longitudinal position of the blades 40 on the mast 570 and moving them relative to the hub assembly 40, in an alternative embodiment of the blades 500 the surface area of each blade 500 may be adjusted. As shown in FIGS. 27-32, is a first linear actuator 550 is used to move a loop cable 551 connected to the distal ends of a plurality of cables 553 that extend longitudinally over the outer skin layer 70. The distal ends of the cables 553 are attached to a moving loop cable 551 that is pushed and pulled from the end plate on the outer tube of the linear actuator frame 553 mounted over the blade's leading support member.

More specifically, the first linear actuator frame includes a large inner tube 565 and a small outer tube 568. Affixed to the large inner tube 565 are two perpendicular brackets 570. Attached to the two brackets 570 and extending longitudinally are two support arms 572, 574. Mounted on the inner tube 565 is an electric actuator 575. Attached to the distal end of the small outer tube 568 is a cable connector 569. Attached to the cable connector 569 is a loop cable 551. The ends of the loop cable 551 extend through bores formed on the end bracket and connected to the distal ends of cables 553 that extend longitudinally on the outer skin layer 70. During use, the loop cable 551 is pushed or pulled that causes the outer skin layer 70 to expand or collapse and thereby change the blade's surface area. In the embodiment shown herein, the first linear actuator 550 is coupled to wind speed sensors, electrical output sensors or a programmable logic controller.

Each blade 40 may also include a longitudinally aligned rigid guide shield 800 disposed adjacent to the mast 570.

Figure 34:
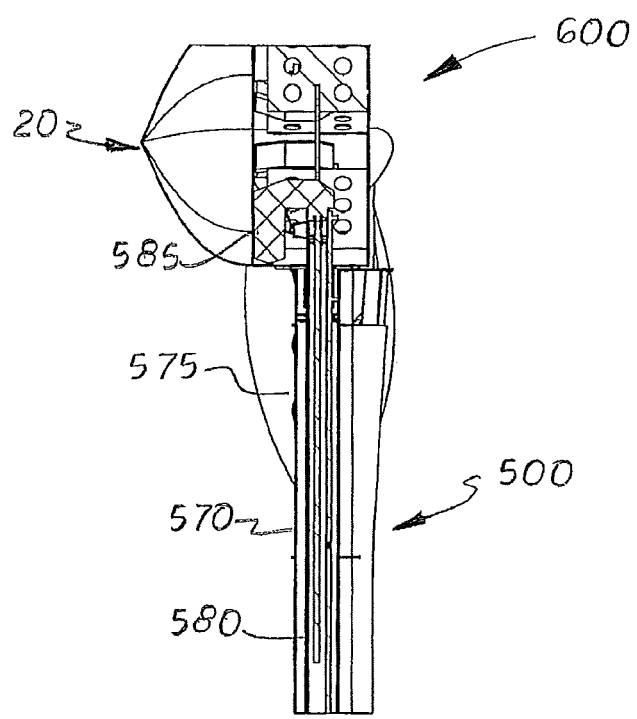
FIG. 34 is a sectional side elevational view of a section of the hub assembly and a proximal end of the blade attached to the hub assembly with a telescopic mast and the second linear actuator located thereon.

Referring to FIG. 34, an optional second linear actuator 600 is connected to the mast 575 which causes the mast 575 to extend and reposition the blade 500 at a greater radius from the hub assembly 20. During low to moderate winds, all of the masts 570 are expanded to increase the hub assembly's sweep area (denoted as SA1 in FIG. 25) and maximize power generation. During high winds, all of the masts retract thereby decreasing the sweep area (denoted SA2 in FIG. 27) and possible destruction.

As shown in FIG. 34, the adjustable mast 570 includes an inner tube 575 and an outer tube 580. The inner tube 575 is linked to a drive motor 585 located inside the hub assembly 20. When the drive motor 585 is rotated, the outer tube 580 moves longitudinally inward and outward relative to the inner tube 575 to retract or extend the mast 570.

Attached to the proximal end of the blade 500 is a slide ring bracket 590 configured to slide over the inner tube 575. Attached to the distal end of the blade 500 is a fixed outer end plate. The drive motor 585 is connected to a wind speed sensor 600, or to a RPM tip speed sensor 605, or to a programmable logic controller (PLC) 610 that continuously monitors the electrical energy produced by the generator. When the sensors 600, 605, or PLC 610 detects low wind speeds, low RPM speed, or low electrical output, respectively, the drive motor 585 is activated which causes the mast 570 to expand its length 25-50%. When the sensor 600, 605, or PLC 610 detects high wind speeds, high tip speed, or excessive electrical output, the drive motors 585 are activated in the reverse direction which causes the masts 570 to retract entirely or to a suitable length.

Figure 36:
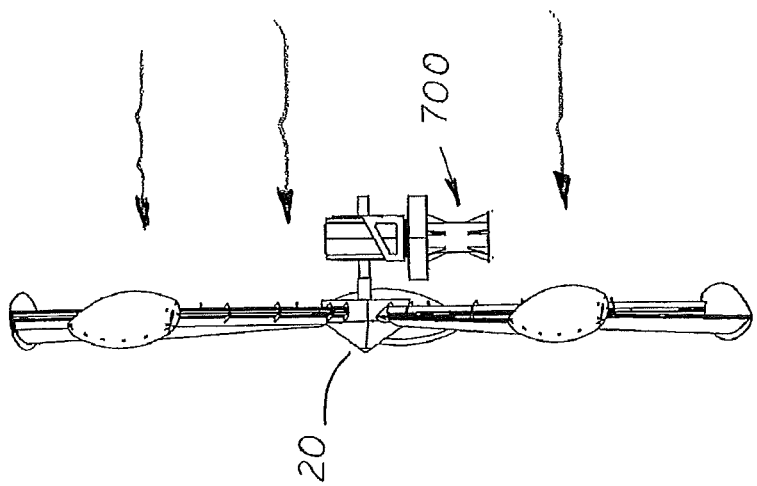
FIG. 36 is a side elevational view of the wind generator shown in FIG. 35.
Figure 35:
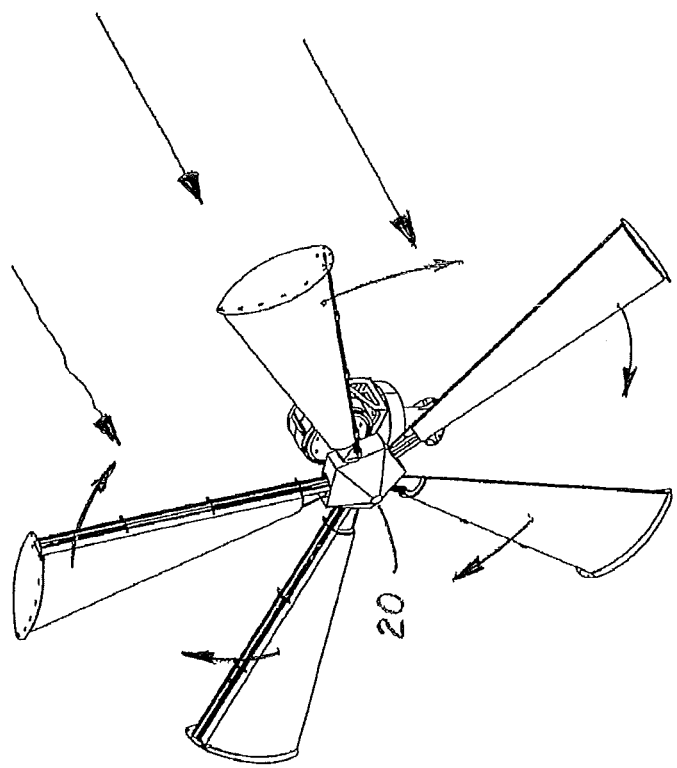
FIG. 35 is a front perspective view of a wind generator with the hub located downwind from the tower with the hub mounted on a direct drive axle on a generator system mounted on a generator mounting platform.

As stated above, the above generator systems 10 may be configured to the hub assembly 20 is located downstream from the tower 200 as shown in FIGS. 35 and 36. In this orientation, the hub assembly 20 is mounted on a direct drive axle. The generator 34 is mounted on a rotating generator mounting platform 600.

Figure 37:
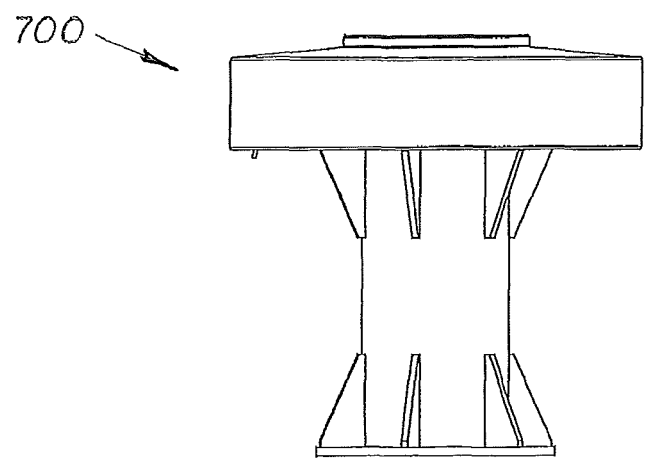
FIG. 37 is a side elevational view of the generator mounting platform.
Figure 38:
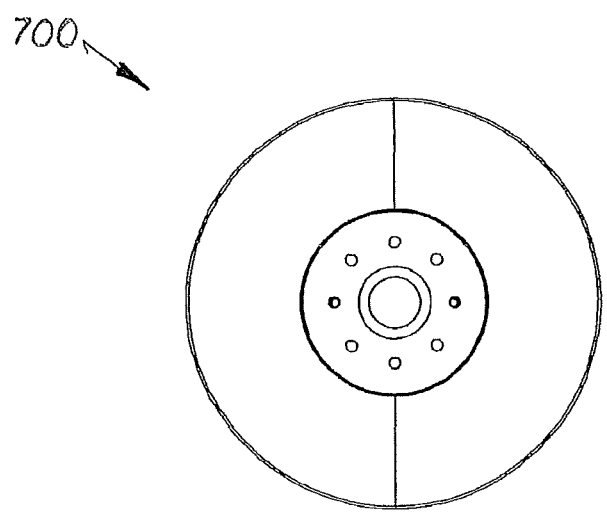
FIG. 38 is a top plan view of the generator mounting platform.
Figure 39:
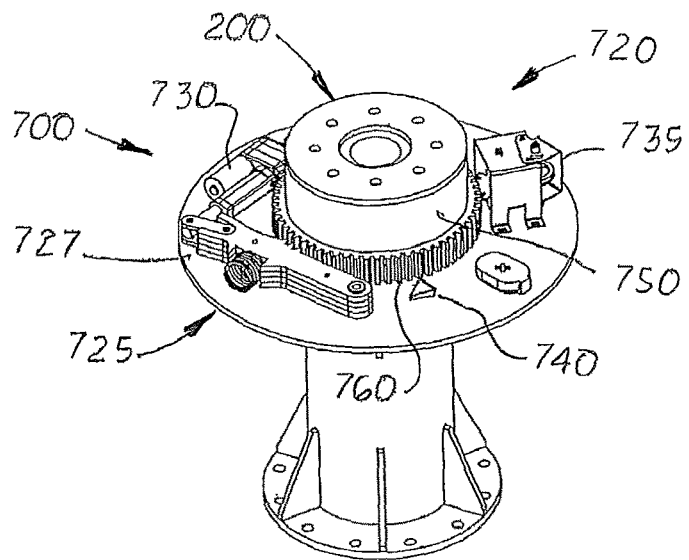
FIG. 39 is a perspective view of the generator mounting platform with the upper cover removed.
Figure 40:
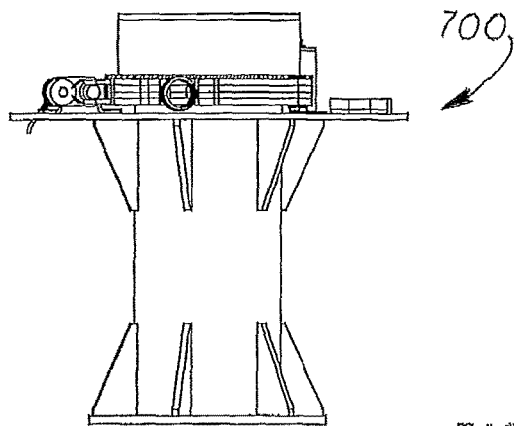
FIG. 40 is a top plan view of the generator mounting platform shown in FIG. 39.
Figure 41:
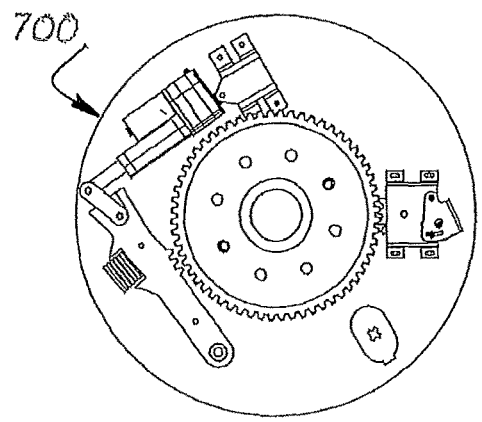
FIG. 41 is a top plan view of the generator mounting platform shown in FIGS. 39 and 40.

FIGS. 37 and 38 are views of the generator mounting platform 700. FIG. 39 is a perspective view of the generator mounting platform 700 with the upper cover removed showing an automatic yaw steering mechanism 720 The yaw steering mechanism 720 includes lower disc 725 fixed on the end of the tower. Mounted on the top surface of the lower disc 725 is a spring biased locking arm 727, a linear actuator 730, an electro-magnetic brake 735, and an optional zero stop 740. Extending upward and coaxially aligned with the lower disc 725 is a rotating cylindrical neck 750. Mounted on the lower edge of the neck 750 is a fixed ring gears 760 with teeth that mesh with a tooth 662 on the locking lever 760. The generator assembly is attached to a generator attachment plate attached to the upper end of the neck 750.

During operation, the locking arm 740 and the linear actuator 730 electrically connected to a voltage sensor (not shown). Programmed in the PODS on-board computer are algorithms that when the voltage reaches a predetermined level the locking arm 740 engages. This maximizes efficiency and eliminates unwanted yaw as a result of wind speed fluctuations. Because the hub assembly is downwind and not tail rudder is used, a phenomena known as 'wind wandering' which reduces efficiently. At any moment, the wind speed and the direction of the wind is constantly changing. When the locking mechanism 760 is used, an inverter (not shown) connected to the generator system 10 extracts power which creates resistance which results in an undesired yawing or twisting. The locking system prevents rotation or yawing of the hub assembly.

In summary, during low to moderate winds the locking mechanism is unlocked so that it may wander and find the wind direction. When a weather front arrives bringing suitable winds, and output voltage reaches a desired level (ie. 150V). The locking mechanism is activated thereby locking the hub assembly in a fixed position. The locking mechanism remains locked until: (a) the system detects a low voltage below present minimum voltage for 10 min; or (b) the system detects high voltages above below a present maximum voltage. When the voltage is below or above the present amounts, the locking mechanism unlocks and the hub assembly may wander.

In compliance with the statute, the invention described has been described in language more or less specific as to structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

The invention claimed is:

1. An advertising horizontal axis wind generator, comprising;
  a. wind generator with a plurality of lightweight hybrid blades, each said hybrid blade includes;
    an internal frame that includes an inside hub mounting plate, a leading edge support member, a trailing edge support member, and a distal end opposite said inside hub mounting plate;
    an outer skin layer having an inside surface disposed over one half of said internal frame to form a curved cupping surface on one surface of said blade, said outer skin layer being securely attached along one edge to said leading edge support member and being removably attached along a trailing edge opposite said trailing edge support member that releases said trailing edge from said trailing edge support member when excessive wind flows against said inside surface of said outer skin layer;
    an end plate attached to internal frame configured to block the flow of wind over the distal end of said blade, said end plate includes at least one louver that selectively opens to allow wind to travel through said end plate; and
  b. advertising indicia displayed on said outer layer of at least one hybrid blade.

2. The horizontal axis wind generator, as recited in claim 1, further including a wind speed detector coupled to said louver that opens said louver when the wind reaches or exceeds a predetermined speed.

3. The horizontal axis wind generator, as recited in claim 1, wherein said trailing edge of said outer skin layer is attached to said internal frame with hook and loop connectors.

4. The horizontal axis wind, generator, as recited in claim 1, wherein said outer skin layer is made of polyethylene film or polyvinyl chloride film.

5. The horizontal axis wind generator, as recited in claim 1, further including each said internal frame includes at least one wind spar extending between said leading edge support member and said trailing edge support member.

6. The horizontal axis wind generator, as recited in claim 1, further including hook and loop connectors that attach said trailing edge of said outer skin layer to said internal frame.

* * * * *